US009073077B2

(12) United States Patent
Unosawa et al.

(10) Patent No.: US 9,073,077 B2
(45) Date of Patent: Jul. 7, 2015

(54) SPRAY GUN

(75) Inventors: Kazuomi Unosawa, Shinjuku-ku (JP); Shigemi Isobe, Shinjuku-ku (JP); Takerou Adachi, Shinjuku-ku (JP); Hirotsune Yasumi, Shinjuku-ku (JP); Kouji Fukuda, Okayama (JP); Naoya Watanabe, Okayama (JP)

(73) Assignee: FREUND CORPORATION, Tokyo (JP)

(*) Notice: Subject to any disclaimer, the term of this patent is extended or adjusted under 35 U.S.C. 154(b) by 428 days.

(21) Appl. No.: 13/502,556

(22) PCT Filed: Oct. 19, 2010

(86) PCT No.: PCT/JP2010/068369
§ 371 (c)(1),
(2), (4) Date: May 11, 2012

(87) PCT Pub. No.: WO2011/049081
PCT Pub. Date: Apr. 28, 2011

(65) Prior Publication Data
US 2012/0234942 A1 Sep. 20, 2012

(30) Foreign Application Priority Data
Oct. 20, 2009 (JP) ................. 2009-241005

(51) Int. Cl.
*B05B 7/06* (2006.01)
*B05B 13/02* (2006.01)
(Continued)

(52) U.S. Cl.
CPC ............. *B05B 13/0257* (2013.01); *B05B 7/062* (2013.01); *B05B 7/066* (2013.01); *B05B 7/06* (2013.01);
(Continued)

(58) Field of Classification Search
CPC .......... B05B 7/06; B05B 7/062; B05B 7/067; B05B 7/068; B05B 7/0807; B05B 7/0884; B05B 13/0257

USPC ........ 239/290, 292, 296, 297, 298, 299, 300, 239/301
See application file for complete search history.

(56) References Cited

U.S. PATENT DOCUMENTS 5,344,078 A * 9/1994 Fritz et al. ............... 239/296
5,409,162 A * 4/1995 Sickles ..................... 239/3
(Continued)

FOREIGN PATENT DOCUMENTS

| JP | 7-24045 | 1/1995 |
| JP | 9-164345 | 6/1997 |

(Continued)

OTHER PUBLICATIONS

English translation of International Preliminary Report on Patentability issued May 24, 2012 in International (PCT) Application No. PCT/JP2010/068369.
(Continued)

*Primary Examiner* — Dinh Q Nguyen
*Assistant Examiner* — Juan C Barrera
(74) *Attorney, Agent, or Firm* — Wenderoth, Lind & Ponack, L.L.P.

(57) ABSTRACT

A spray gun (1) forms a desired spray pattern by atomizing by means of atomizing air (A) a spray liquid which is sprayed from a liquid ejection port (44) opened/closed by a needle valve (4), and jetting pattern air (P) to the flow of spray mist of the atomized spray liquid. A nozzle taper angle ($\theta1$) is set in a range of 5° to 15°, and a cap taper angle ($\theta2$) is set in a range of 20° to 40°. Atomizing air (A) is jetted from a nozzle insertion hole (58) toward the center of a nozzle (3). Pattern air (P) is jetted in a spreading suppressed region (R) wherein the flow of the spray mist does not spread over an area greater than or equal to a predetermined cross-sectional area, to the flow of spray mist, and as a result, the spray mist is more uniformly sprayed over a wide range.

12 Claims, 14 Drawing Sheets

(51) Int. Cl.
*B01J 2/00* (2006.01)
*B01J 2/14* (2006.01)
*B05B 7/08* (2006.01)
*B05B 7/12* (2006.01)
B05B 15/06 (2006.01)
B05B 15/10 (2006.01)

(52) U.S. Cl.
CPC .................. *B05B 7/067* (2013.01); *B01J 2/006* (2013.01); *B01J 2/14* (2013.01); *B05B 7/0815* (2013.01); *B05B 7/1263* (2013.01); *B05B 13/0278* (2013.01); *B05B 15/065* (2013.01); *B05B 15/10* (2013.01)

(56) References Cited

U.S. PATENT DOCUMENTS 5,540,385 A * 7/1996 Garlick .................... 239/290
6,056,213 A * 5/2000 Ruta et al. ................ 239/337
2005/0189445 A1 * 9/2005 Hartle et al. .............. 239/691
2007/0209582 A1   9/2007 Takei et al.
2008/0289571 A1  11/2008 Isobe et al.
2009/0121048 A1   5/2009 Noshima

FOREIGN PATENT DOCUMENTS

| | | |
|---|---|---|
| JP | 2001-137747 | 5/2001 |
| JP | 2003-220353 | 8/2003 |
| JP | 2003-525746 | 9/2003 |
| JP | 2007-237130 | 9/2007 |
| JP | 2008-253910 | 10/2008 |
| WO | 01/62434 | 8/2001 |
| WO | 2008/093441 | 8/2008 |

OTHER PUBLICATIONS

International Search Report issued Nov. 30, 2010 in International (PCT) Application No. PCT/JP2010/068369.

* cited by examiner (a)

(b)

(a)

(b)

SPRAY GUN

TECHNICAL FIELD

The present invention relates to a spray gun that supplies objects of processing with liquid while atomizing the liquid and, more particularly, to a spray gun suitably applied to a powder and particle processing apparatus that performs granulation, coating, and the like of a powder and particle.

BACKGROUND ART

Conventionally, in a granulation/coating apparatus (powder and particle processing apparatus) that performs granulation, coating, drying, and the like of a powder and particle, liquid spraying using a spray gun has been widely conducted. The spray gun of the powder and particle processing apparatus is typically disposed inside a powder and particle container. The spray gun uses compressed air to spray a fluidized or tumbled powder and particle with binder liquid or coating liquid (hereinafter, collectively referred to as "coating liquid"). Hot air or cold air is appropriately supplied/discharged to/from the container as air for drying (dry air) to promote formation or drying of a coating layer.

Patent Document 1: Jpn. PCT National Publication No. 2003-525746
Patent Document 2: Jpn. Pat. Appln. Laid-Open Publication No. 2001-137747
Patent Document 3: Jpn. Pat. Appln. Laid-Open Publication No. 2003-220353

DISCLOSURE OF THE INVENTION

Problems to be Solved by the Invention

However, a conventional spray gun is narrow in spray pattern (spray zone) and large in difference of a spray amount within a spray area. Therefore, when a large amount of coating liquid is sprayed, objects of processing such as tablets get wet locally, preventing formation of a uniform coating layer on the surface of each of the tablets, which results in a failure to ensure stable product quality. To cope with this problem, a reduction in the supply amount of the coating liquid allows a variation in the spray amount within the spray area to be suppressed; however, the reduction in the supply amount of the coating liquid leads to an increase in the time required for coating process, degrading processing efficiency.

Under such circumstances, in order to obtain a uniform and stable spray amount without increasing the coating process time an existing powder and particle processing apparatus uses an increased number of spray guns to perform small amount/wide range spraying to balance between the processing time and product quality. However, the increase in the number of spray guns may lead not only to an increase in apparatus price but also to an increase in man-hour required for installation or maintenance of the spray guns. The increase in the man-hour required for the spray gun installation or the like may reduce production efficiency, which in turn may cause an increase in production cost (cost for producing a product such as the tablet using the powder and particle processing apparatus), including the increase in the apparatus price.

An object of the present invention is to provide a spray gun suitably applied to the powder and particle processing apparatus, which has a wide and stable spray pattern and can prevent local leakage even when large-volume spraying is performed.

Means for Solving the Problems

A spray gun according to the present invention includes: a nozzle body including a nozzle portion having a liquid ejection port from which spray liquid is ejected; and an air cap including a nozzle insertion hole in which the nozzle portion is positioned and a pattern air hole which is disposed on the front side relative to the liquid ejection port and through which pattern air is jetted to a mist flow of the spray liquid that has been atomized and is configured to spray, to an object of processing, the spray liquid ejected from the liquid ejection port and atomized by atomizing air jetted from the periphery of the nozzle portion to the front of the liquid ejection port. The atomizing air is jetted toward a center line of the liquid ejection port from the periphery of the nozzle portion positioned in the nozzle insertion hole to suppress spreading of the mist flow, and the pattern air is jetted to the mist flow in a spreading suppressed region where the mist flow does not spread over an area greater than or equal to a predetermined cross-sectional area.

The spray gun according to the present invention is configured to jet the pattern air to the spray mist flow in the spreading suppressed region where the spray mist flow is not increased in diameter and a predetermined cross-sectional area (e.g., equal to or less than four times the cross-sectional area of the liquid ejection port) thereof is maintained, with the result that the spray pattern does not become the figure-of-eight but assumes substantially an oval shape and that the difference of the spray amount within the spray area can be reduced to a tolerable level.

In the spray gun, the spray mist may have substantially a circular cross-section in the spreading suppressed region, where the pattern air may be applied to the spray mist to form an oval-shaped spray pattern.

In the spray gun according to the present invention, the nozzle portion may be formed in a tapered shape such that it becomes smaller in diameter toward the leading end thereof to be inclined at an angle θ1, and the nozzle insertion hole inner wall of the air cap may be formed in a tapered shape such that it becomes smaller in diameter toward the leading end thereof to be inclined at an angle θ2 larger than the angle θ1 (θ2>θ1). The angle θ1 may be set in a range of 5° to 15°, and the angle θ2 may be set in a range of 20° to 40°. Further, a thickness t of an outer peripheral portion of the liquid ejection port in the nozzle body may be set in a range of 0.2 mm to 0.4 mm. Further, the nozzle taper angle θ1 may be set in a range of 8° to 12°, and the cap taper angle θ2 may be set in a range of 25° to 35°.

The spray gun may be used to spray the spray liquid to a moving objected of processing. The spray gun may be disposed in a casing so as to spray the spray liquid to an object of processing housed in the casing. The spray gun may be disposed in a casing having an air-permeable structure. In this case, the spray gun may be used in a pan coating apparatus that applies coating process to a powder and particle housed in the casing having the air-permeable structure. The pan coating apparatus may be an apparatus of a front side air charging type that introduces coating process gas from the apparatus front side. The pan coating apparatus may have a punched type drum whose barrel portion is formed so as to be air-permeable, and the spray gun may be arranged in the drum.

Advantages of the Invention

In the spray gun according to the present invention in which the spray liquid ejected from the liquid ejection port is atomized by the atomizing air, and the pattern air is applied to the spray mist flow of the atomized spray liquid to thereby obtain a desired spray pattern, the pattern air is applied to the spray mist flow in the spreading suppressed region where the mist flow does not spread over an area greater than or equal to a predetermined cross-sectional area. Thus, the spray mist can be sprayed over a wider range and more uniformly than in the case of a conventional spray gun.

Thus, the object of processing such as tablets does not get wet locally even when a large amount of coating liquid is sprayed thereto and a uniform coating layer can be formed on the tablets, thus securing stable product quality. Further, even when the coating process is performed with a large air volume, it is possible to suppress a variation in the spray amount within the spray area, thereby reducing a time required for the coating process while maintaining the product quality. Further, it is possible to provide uniform and stable spray amount without increasing the number of the spray guns to reduce the number of the spray guns to be used, thereby allowing a reduction in the apparatus price. Further, the number of incidental facilities such as pump units, valves, electromagnetic valves can be reduced. In addition, man-hour required for installation or maintenance of the spray guns can be reduced to allow a reduction in the product cost.

BRIEF DESCRIPTION OF THE DRAWINGS

FIG. 11 is an explanatory diagram illustrating a distribution of spray mist sprayed from the spray gun, in which FIGS. 11(a) and 11(b) illustrate the distribution of the mist sprayed from the conventional spray gun and that of the mist sprayed from the spray gun according to the present invention, respectively.

EXPLANATION OF SYMBOLS

Figure 1:
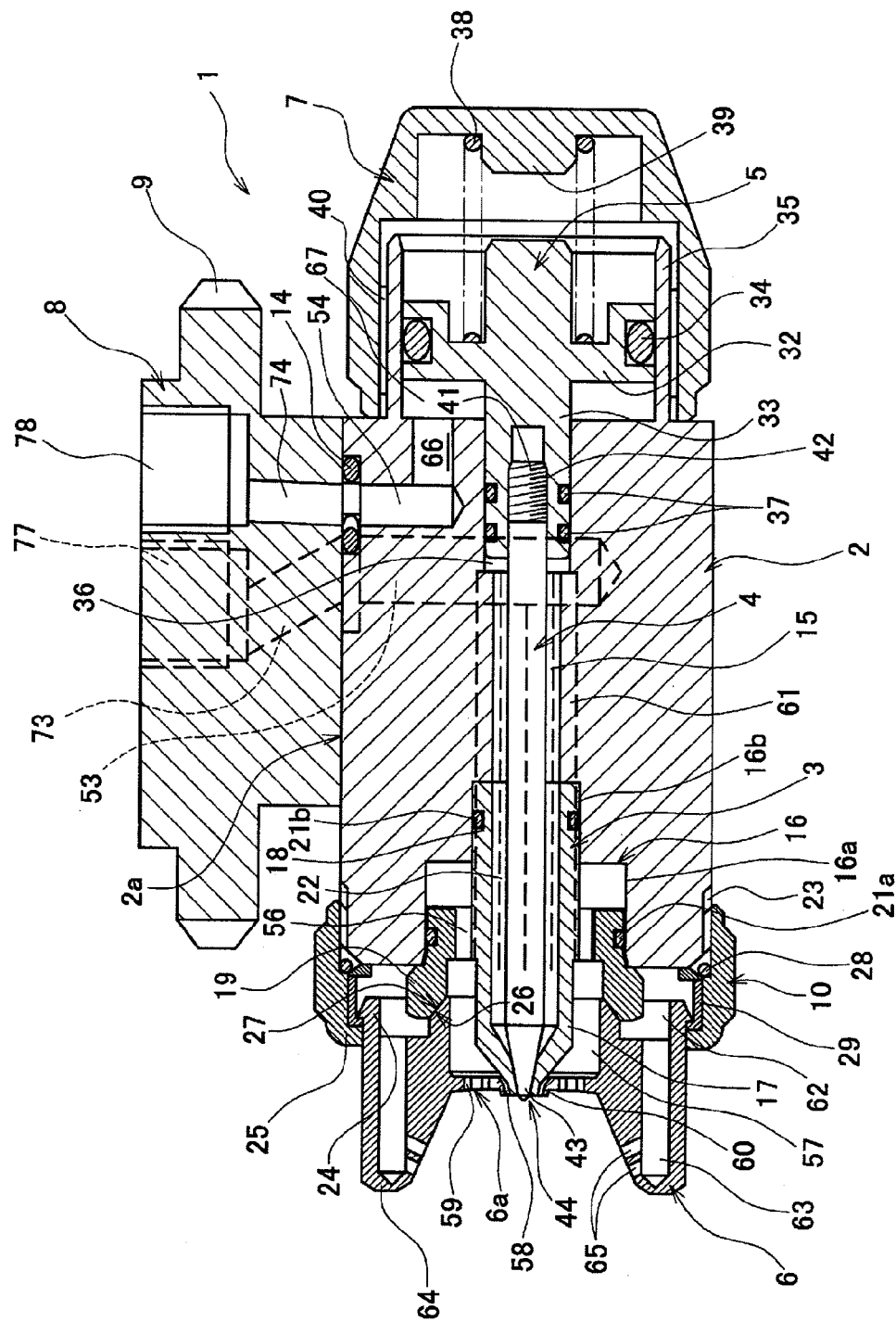
FIG. 1 is a cross-sectional diagram illustrating a spray gun according to an embodiment of the present invention as viewed from side.

1: Spray gun
2: Body block
2a: Block upper surface
3: Nozzle (nozzle body)
4: Needle valve
5: Piston
6: Air cap
6a: Left end surface
7: Cylinder cap
8: Joint block
9: Screw portion
10: Cap nut
11: Bolt hole
12: Female screw hole
13: Hexagonal-hole bolt
14: O-ring
15: Needle hole
16: Nozzle attachment portion
16a: Large diameter portion
16b: Small diameter portion
17: Nozzle portion
18: Boss portion
19: Flange portion
21a: O-ring
21b: O-ring
22: Flow path hole
23: Cap nut attachment portion
24: Engagement portion
25: Inner flange portion
26: Cap abutting surface
27: Nozzle abutting surface
28: Cap retainer
29: Packing
32: Body portion
33: Rod portion
34: O-ring
35: Cylinder portion
36: Piston hole portion
37: O-ring
38: Piston spring
39: Spring holder potion
40: End cap attachment portion
41: Male screw portion
42: Female screw portion
43: Needle-shaped valve portion
44: Liquid ejection port
51: Spray liquid flow path
52: Atomizing air flow path
53: Pattern air flow path
54: Needle air flow path
55: Flow path
56: Communication hole
57: Atomizing air chamber
58: Nozzle insertion hole
59: Auxiliary hole
60: Convex portion
60a: Leading end surface
61: Flow path
62: Pattern air chamber
63: Air flow path
64: Projection portion 65: Pattern air hole
66: Flow path
67: Cylinder chamber
71: Spray liquid flow path
72: Atomizing air flow path
73: Pattern air flow path
74: Needle air flow path
75: Liquid line port
76: Blowing air line port
77: Pattern air line port
78: Cylinder line port
81: Leading end outer peripheral portion
82: Inner wall
83: Atomizing air jetting port
84: Nozzle leading end portion
91: Spray liquid tube
92: Atomizing air tube
93: Pattern air tube
94: Needle air tube
100: Coating apparatus
101: Drum
102: Casing
102a: Front wall
104: Barrel portion
105: Conical portion
107: Front-surface opening portion
111: Chamber door
112: Hinge
113: Air supply chamber
114: Monitoring window
115: Maintenance door
116: Grip bar
117: Product delivery port
118: Air supply hole
119: Air supply duct
121: Air supply port
122: Wind-direction plate
129: Drum chamber
132: Multi-function unit
133: Support holder
135: Support arm
140: Spray gun attachment portion
141: Female screw portion
$\theta 1$: Nozzle taper angle
$\theta 2$: Cap taper angle
t: Nozzle leading end thickness
A: Atomizing air
C: Cylinder air
L: Coating liquid
P: Pattern air
O: Liquid ejection port center line
R: Spreading suppressed region

BEST MODE FOR CARRYING OUT THE INVENTION

Figure 2:
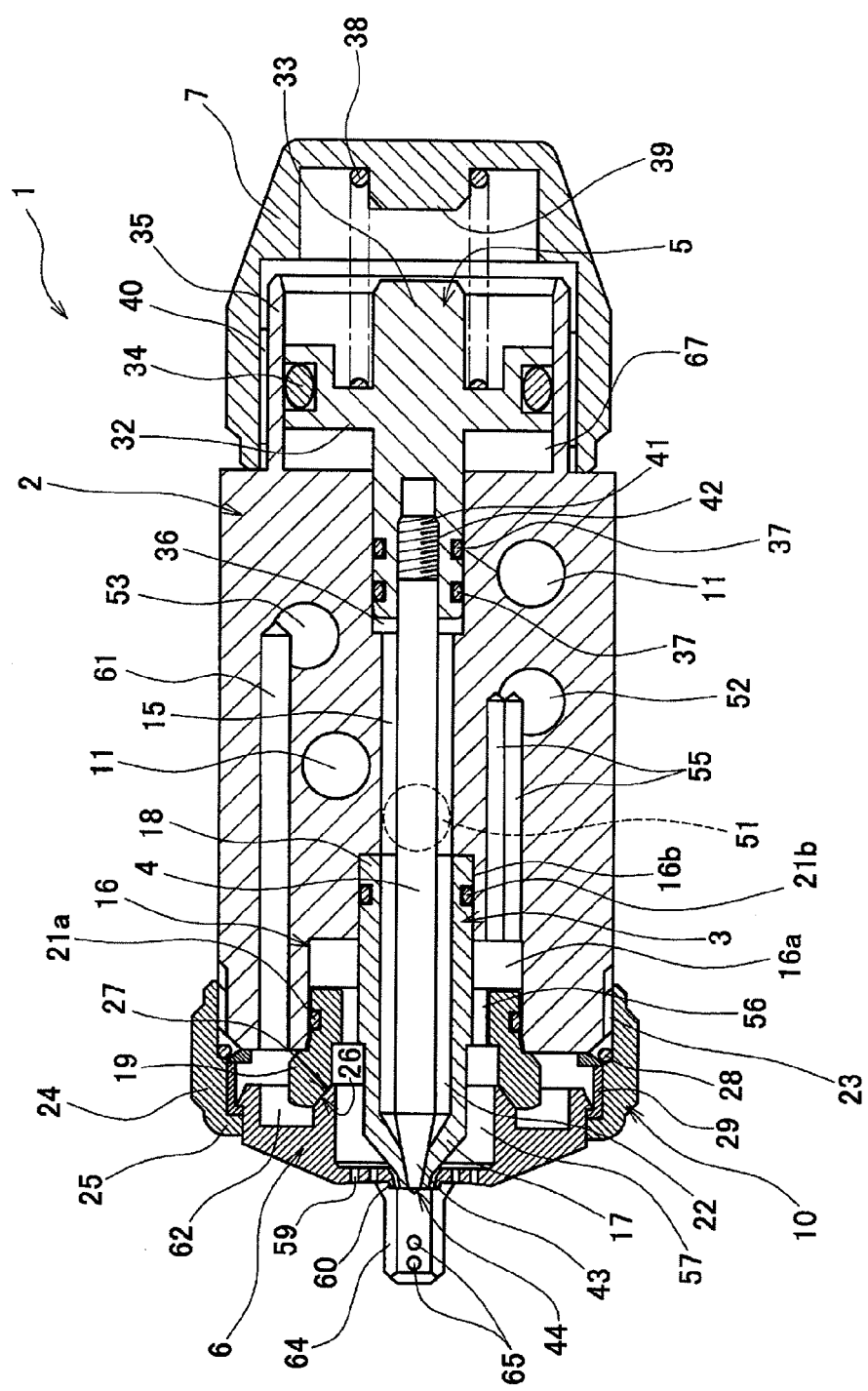
FIG. 2 is a cross-sectional diagram of the spray gun as viewed from above.
Figure 3:
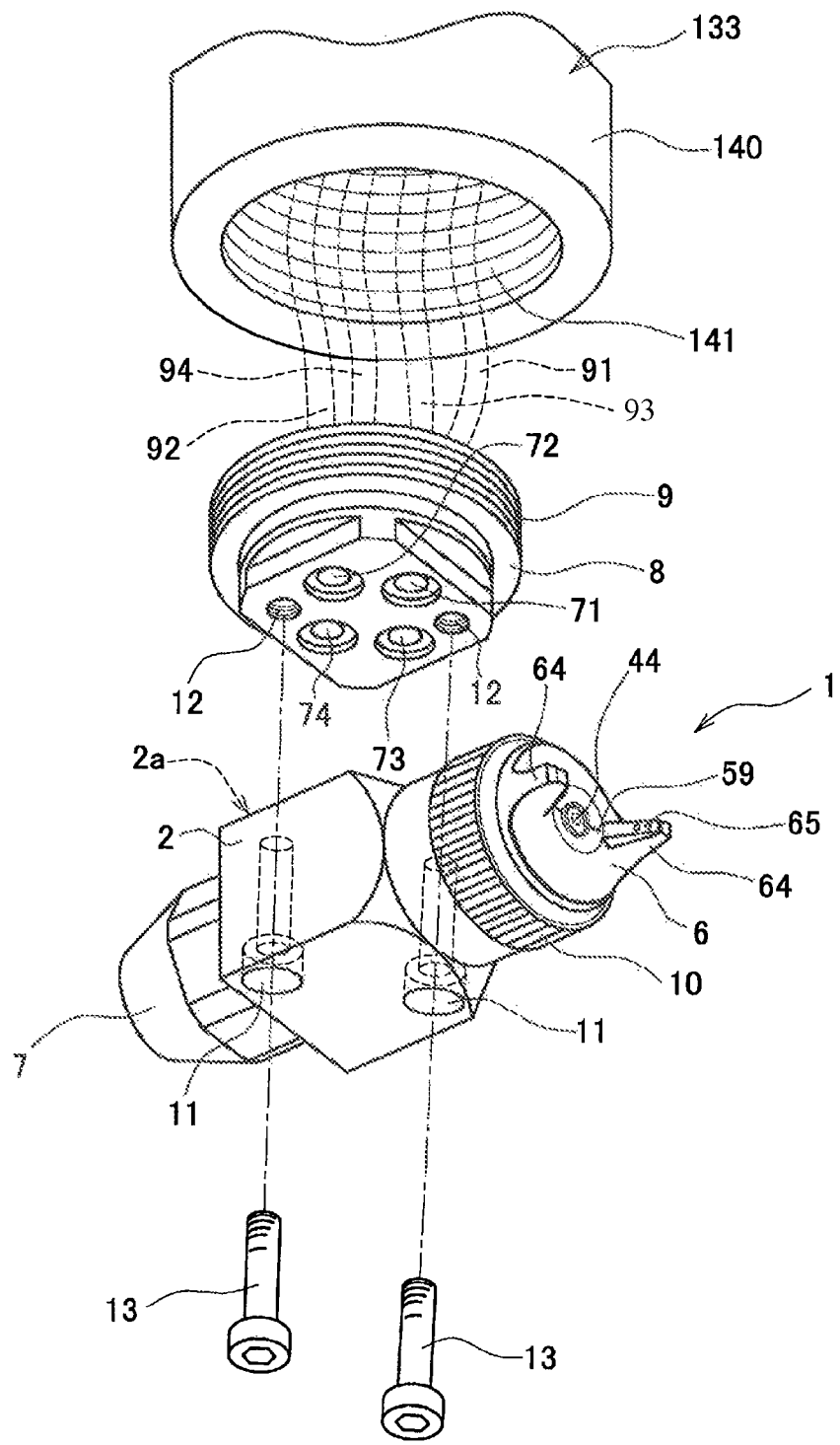
FIG. 3 is an exploded perspective diagram of the spray gun.

An embodiment of the present invention will be described with reference to the accompanying drawings. FIG. 1 is a cross-sectional diagram illustrating a spray gun 1 according to an embodiment of the present invention as viewed from side. FIG. 2 is a cross-sectional diagram of the spray gun 1 as viewed from above (hereinafter, up-down and left-right directions of the spray gun 1 are defined based on FIG. 1). FIG. 3 is an exploded perspective diagram of the spray gun 1. The spray gun 1 of FIG. 1 is set in a pan coating apparatus which is used for producing medicines or foods. The spray gun 1 sprays spray liquid such as coating liquid to objects of processing (tablets, chewing gum, chocolate, etc.) in a processing vessel.

As illustrated in FIGS. 1 and 2, the spray gun 1 includes a body block 2, an air cap 6, a cylinder cap 7, and a joint block 8. A nozzle (nozzle body) 3, a needle valve 4, and a piston 5 are housed in the body block 2 which is made of stainless steel. The air cap 6 and cylinder cap 7 are attached to the front and rear ends of the body block 2, respectively. The joint block 8 is attached to the upper portion of the body block 2. The spray gun 1 is attached to a spray gun support holder in the coating apparatus by a screw portion 9 formed in the outer periphery of the joint block 8. The entire length of the spray gun 1 is about 93 mm. The height and width of the body block 2 of the spray gun 1 is about 40×40 mm. The entire height of the spray gun 1 including the joint block 8 is about 65 mm.

In the spray gun 1, spray liquid such as coating liquid L is sprayed by the nozzle 3 from the center of the air cap 6. Atomizing air A is jetted, together with the coating liquid L, from the center of the air cap 6. The spray liquid is atomized by the atomizing air A. Pattern air P is jetted to a flow of the atomized spray liquid (spray mist flow). The pattern air P is jetted in a direction along a center line O (see FIG. 10) of a liquid ejection port from the leading end of the air cap 6. The spray mist flow is sprayed to the objects of processing while being formed into a desired spray pattern by the pattern air P.

Figure 4:
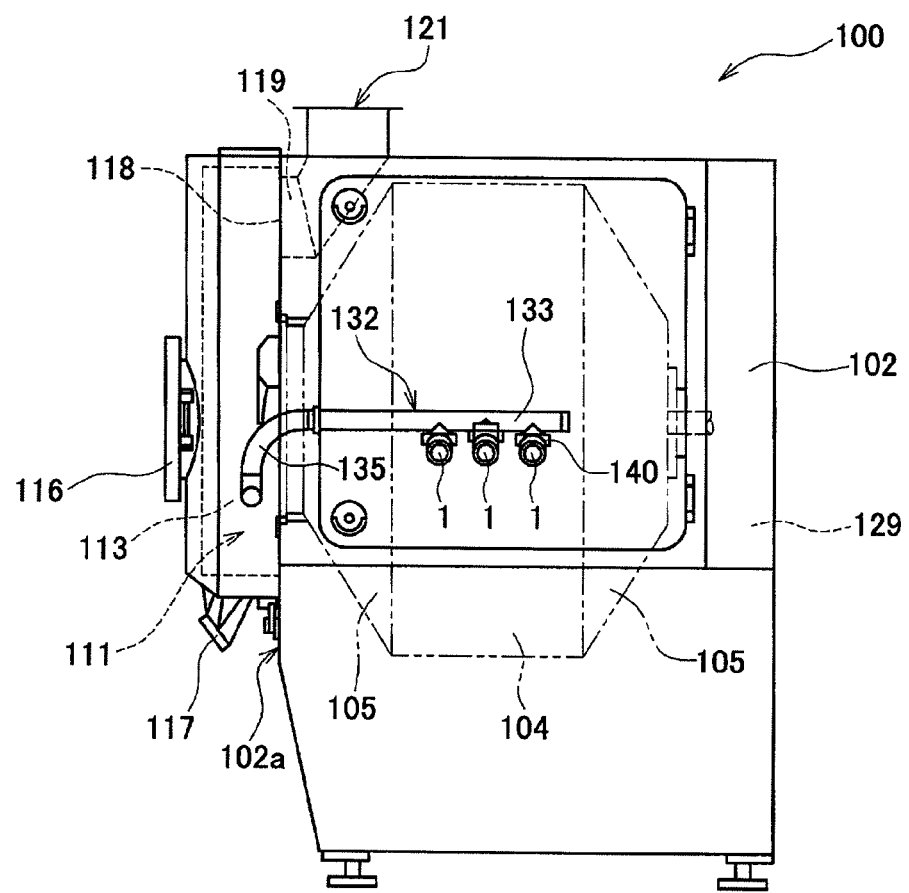
FIG. 4 is a right side view illustrating a configuration of a coating apparatus in which the spray gun of FIG. 1 is set.
Figure 5:
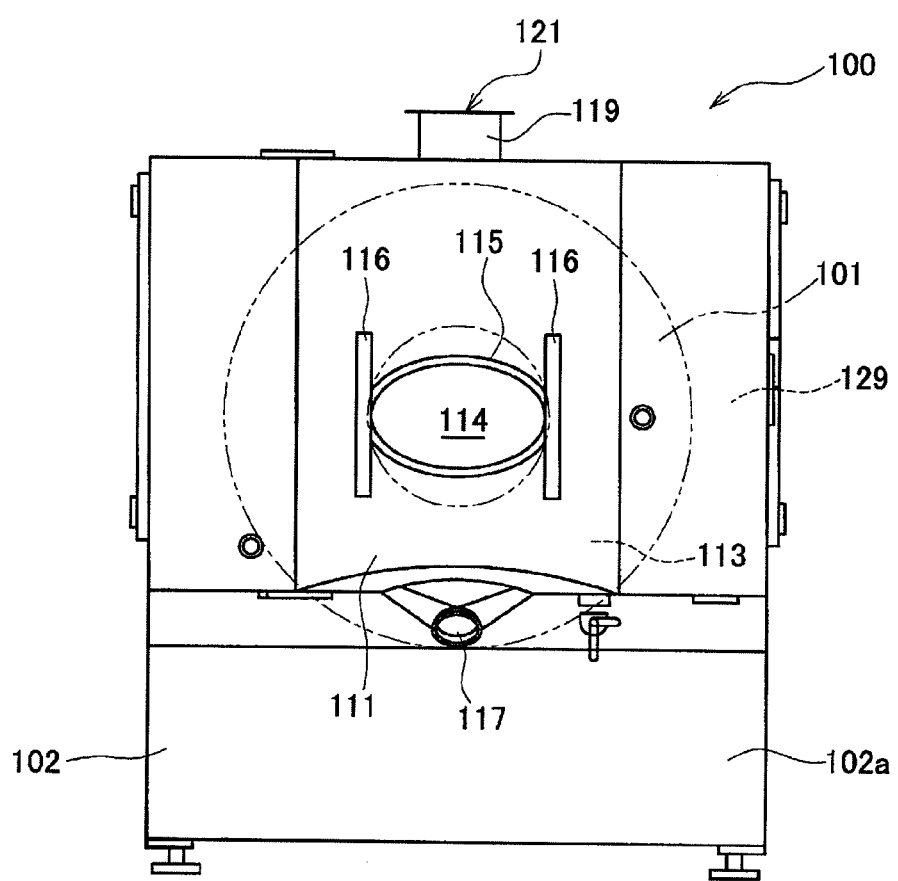
FIG. 5 is a front view of the coating apparatus of FIG. 4.

FIG. 4 is a right side view illustrating a configuration of the coating apparatus in which the spray gun 1 of the present invention is set, and FIG. 5 is a front view thereof. A coating apparatus 100 illustrated in FIGS. 4 and 5 is a jacketless-type coating apparatus using a so-called overall-punched type rotary drum. The objects of processing such as tablets are housed in a rotary drum (coating pan, hereinafter, abbreviated as "drum") 101. The coating liquid is sprayed from the spray gun 1 to the objects of processing in the drum 101, and coating process is performed for the objects of processing.

As illustrated in FIGS. 4 and 5, the coating apparatus 100 has a configuration in which the drum 101 is rotatably installed at a center portion of a casing 102 having an air-permeable structure. The drum 101 is rotated about a substantially horizontal rotation axis. The objects of processing such as chewing gum, chocolate, and tablets are thrown into the drum 101. The drum 101 includes a cylindrical barrel portion 104 and a truncated conical portion 105 which is formed at each end of the barrel portion 104. The barrel portion 104 is formed of porous stainless plates (punched plate). That is, the drum 101 is a punched drum having the air-permeable barrel portion. Although the coating apparatus 100 uses, as the drum 101, the overall-punched type rotary drum in which the entire circumference of the barrel portion is formed so as to be air-permeable, the entire circumference thereof need not be air-permeable but only a part of the barrel portion may be formed so as to be air-permeable. On the right side of the drum 101 of FIG. 4, there is arranged a drum-rotating mechanism (not illustrated) using an electric drum-driving motor.

A casing 102 has a drum chamber 129 housing the drum 101. That is, the casing 102 has a dual structure in which the drum 101 is housed in the drum chamber 129. The front (left side of FIG. 4, see FIG. 5) of the casing 102 is divided into three sections. A chamber door 111 is provided at the center of the front of the casing. The chamber door 111 is a rectangular parallelepiped box-like member which is supported by a hinge 112 so as to be openable/closable. An air supply chamber 113 is formed inside the chamber door 111. A maintenance door 115 is provided at the front of the chamber door 111. A monitoring window 114 is formed at the center of the maintenance door 115. A grip bar 116 extending in the vertical direction is attached to each side of the maintenance door 115. Further, a product delivery port 117 from which products that have subjected to the processing are taken out is attached to a lower portion of the chamber door 111.

Figure 6:
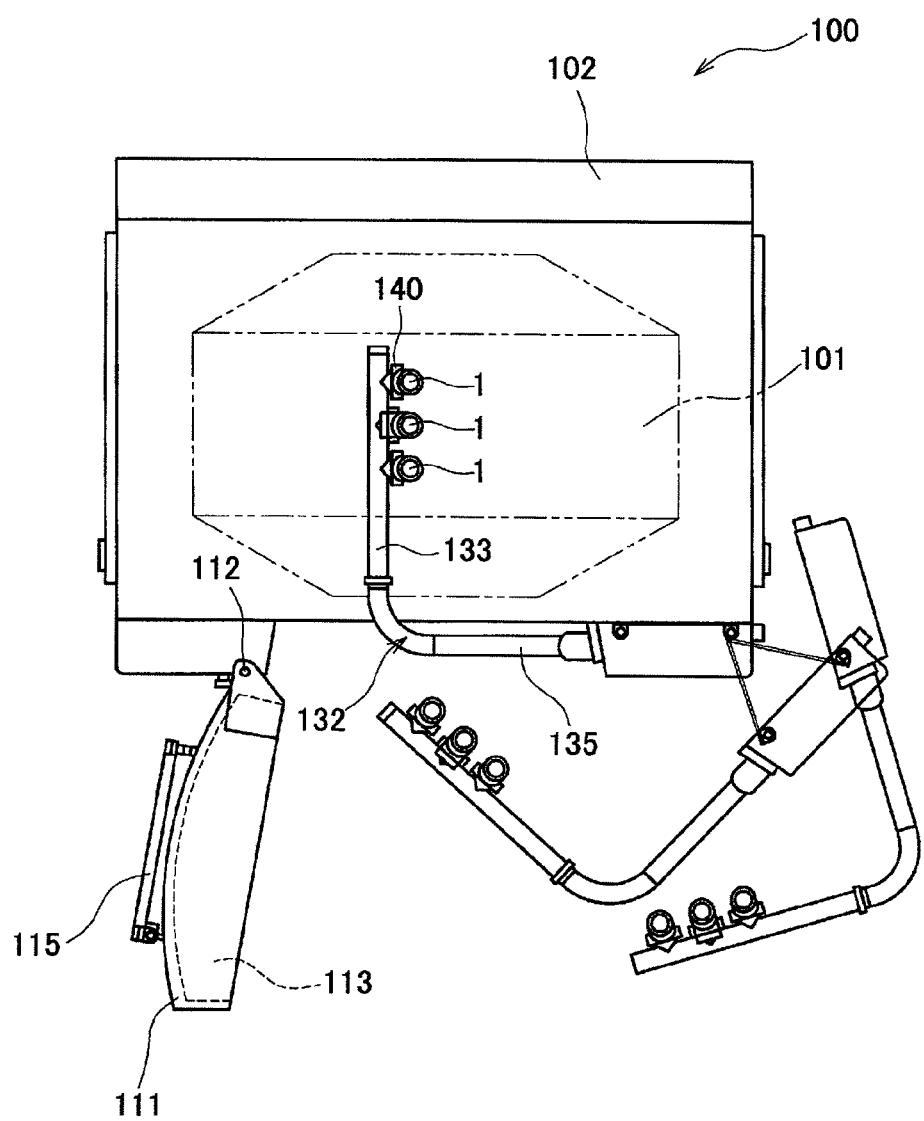
FIG. 6 is a plan view illustrating a state where a chamber door of the coating apparatus of FIG. 4 is opened.
Figure 7:
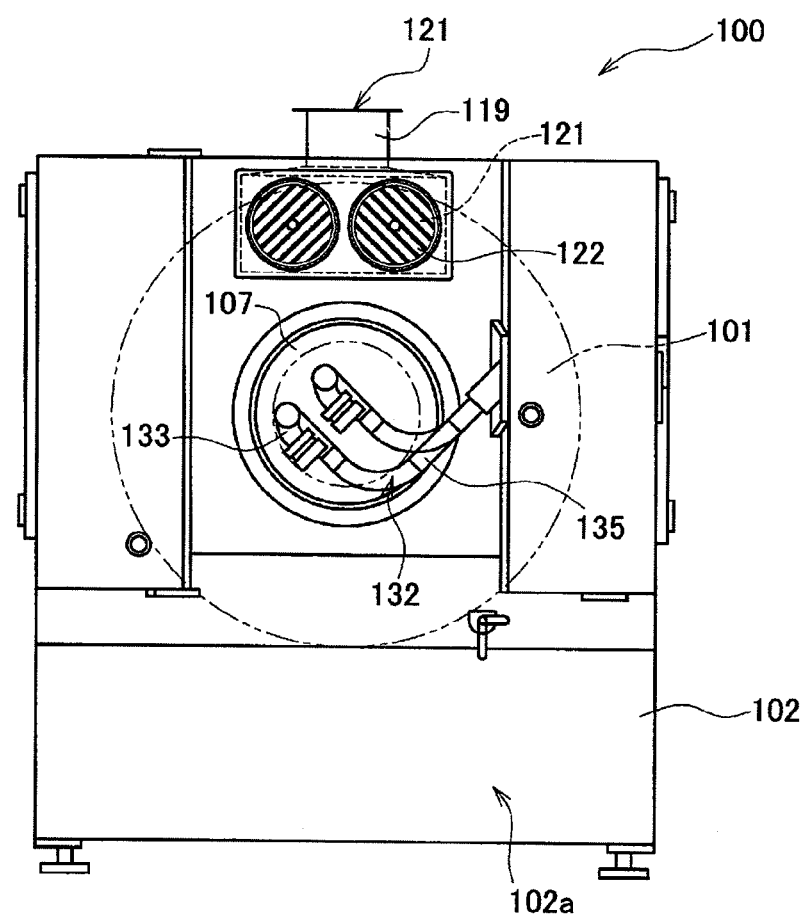
FIG. 7 is a front view of the coating apparatus in the state illustrated in FIG. 6.

FIG. 6 is a plan view illustrating a state where the chamber door 111 of the coating apparatus is opened. FIG. 7 is a front view of the coating apparatus illustrating a state where the chamber door 111 is opened. The coating apparatus 100 is a front side air charging type pan coating apparatus, and the casing 102 has the air-permeable structure capable of charging/discharging dry air. In the coating apparatus 100, the dry air (coating gas) is introduced into the drum 101 through the front chamber door 111. The dry air supplied in the drum 101 is discharged from the coating apparatus 100 through a not illustrated exhaust duct arranged in the casing 102.

As illustrated in FIG. 6, a front wall 102a of the casing 102 is exposed when the chamber door 111 is opened. Then, a state is achieved in which a front-surface opening portion 107 of the drum 101 is opened. Above the front-surface opening portion 107, there is further provided an air supply hole 118. Through intermediation of an air supply duct 119 arranged in the casing 102, the air supply hole 118 communicates with an air supply port 121. To a front surface of the air supply hole 118, there are attached wind-direction plates 122. In the coating apparatus 100, when the chamber door 111 is closed, the front-surface opening portion 107 of the drum 101 faces and communicates with the air supply chamber 113. Accordingly, the dry air supplied into the air supply port 121 flows into the air supply chamber 113 while being rectified by the wind-direction plates 122. Then, the air that has flowed into the air supply chamber 113 is supplied into the drum 101 through the front-surface opening portion 107.

As illustrated in FIGS. 6 and 7, with respect to the front wall 102a of the casing, the spray guns 1 are inserted into the drum through the front-surface opening portion 107 of the drum 101. The spray guns 1 are attached to a multi-function unit 132 arranged in front of the casing 102. The multi-function unit 132 allows the spray guns 1 to be freely inserted into and taken out from the drum from the apparatus front side. The multi-function unit 132 includes a support arm 135 movable in a direction of an angle of 45°. A support holder 133 to which the spray guns 1 are mounted is attached to the support arm 135.

The support holder 133 has spray gun attachment portions 140. The spray guns 1 are each attached to the spray gun attachment portion 140 through the joint block 8 thereof. As illustrated in FIG. 3, a female screw portion 141 is formed in each of the spray gun attachment portion 140. Screwing the screw portion 9 of the joint block 8 into the female screw portion 141 allows the spray gun 1 to be attached to the above-described coating apparatus 100. The joint block 8 is connected with various tubes (spray liquid tube 91, atomizing air tube 92, pattern air tube 93, and needle air tube 94). The various tubes 91 to 94 are inserted into the support holder 133 and support arm 135. The tubes 91 to 94 run in a concealed manner so as to be isolated from a space in the casing 102.

The joint block 8 and body block 2 are fixed to each other by hexagonal-hole bolts 13. Bolt holes 11 are formed in the body block 2 as illustrated in FIG. 3. The joint block 8 has female screw portions 12. The joint block 8 is fixed to the body block 2 by the hexagonal-hole bolts 13 screwed from the bolt hole 11 side. The body block 2 and join block 8 are joined to each other in an airtight manner by an O-ring 14.

A needle hole 15 is formed so as to penetrate the center portion of the body block 2 in the left-right direction of FIG. 1. The needle valve 4 has been inserted into the needle hole 15 in a movable state in the left-right direction. The needle hole 15 is enlarged in diameter at its left side to be a nozzle attachment portion 16. The needle attachment portion 16 is a stepped cylindrical hole constituted by a large diameter portion 16a and a small diameter portion 16b. The large diameter portion 16a is formed in a concaved manner so as to open at the left end surface of the body block 2.

The nozzle 3 is attached to the nozzle attachment portion 16. The nozzle 3 has a nozzle portion 17 at its left end side and a boss portion 18 at its right end side. A flange portion 19 is formed between the nozzle portion 17 and boss portion 18. The flange portion 19 is attached to the large diameter portion 16a of the nozzle attachment portion 16. An O-ring 21a is installed around the outer periphery of the flange portion 19. The O-ring 21a allows the flange portion 19 to be attached to the large diameter portion 16a in an airtight manner. The boss portion 18 is inserted into the small diameter portion 16b. An O-ring 21b is installed around the outer periphery of the boss portion 18. The O-ring 21b allows the boss portion 18 to be attached to the small diameter portion 16b in an airtight manner. A flow path hole 22 is formed so as to penetrate the center portion of the nozzle 3 in an axial direction thereof. The needle valve 4 is inserted into the flow path hole 22.

A cap nut 10 is attached to the left end side of the body block 2. The body block 2 has, at its left end outer peripheral portion, a cap nut attachment portion 23 having a male screw shape. The cap nut 10 is screw-fixed to the cap nut attachment portion 23. The air cap 6 has, at its right end side, an engagement portion 24. The engagement portion 24 is engaged with an inner flange portion 25 formed at the left end portion of the cap nut 10. The cap nut 10 is attached to the cap nut attachment portion 23 in a state where the engagement portion 24 and inner flange portion 25 have been engaged with each other. A cap retainer 28 is interposed between the engagement portion 24 and inner flange portion 25.

The nozzle 3 is held between the body block 2 and air cap 6 by means of the cap nut 10. A tapered cap abutting surface 26 is formed at the left end portion of the flange portion 19 of the nozzle 3. Correspondingly, a nozzle abutting surface 27 is formed at the right end portion of the air cap 6. Both the abutting surfaces 26 and 27 are brought into close contact with each other when the cap nut 10 is fixed, together with the air cap 6, to the cap nut attachment portion 23. The cap retainer 28 and a packing 29 are attached inside the cap nut 10. The cap nut 10 is held at the left end portion of the body block 2 by means of the cap retainer 28. An airtight seal is achieved between the cap nut 10 and air cap 6 by means of the packing 29.

Screwing the cap nut 10 into the cap nut attachment portion 23 to fix the cap nut 10 thereto allows the nozzle 3 to be held and fixed in an airtight manner between the body block 2 and air cap 6. That is, in the spray gun 1, the nozzle 3 can be attached to the body block 2 without use of a special tool. Conventionally, a special tool has been required for attachment/detachment of the nozzle 3 to/from the spray gun, thus degrading workability. On the other hand, in the spray gun 1 according to the present invention, attachment/detachment of the nozzle 3 can be easily achieved by means of the O rings 21a and 21b, packing 29, air cap 6, and cap nut 10. Thus, it is possible to achieve assembly/disassembly of the apparatus more easily than in the conventional spray gun, thereby improving workability at disassembly and washing time.

The piston 5 is fixed to the right end of the needle valve 4 as illustrated in FIGS. 1 and 2. The piston 5 includes a body portion 32 and a rod portion 33. An O-ring 34 is installed around the body portion 32. A cylindrical cylinder portion 35 is formed at the right end of the body block 2. The body portion 32 is housed in the cylinder portion 35 so as to be slidable in the left-right direction. A piston hole portion 36 having a diameter larger than that of the needle hole 15 is formed on the right side thereof. The left end side of the rod portion 33 is inserted into the piston hole portion 36. An O-ring 37 is installed around the rod portion 33. The piston 5 is fixed inside the body block 2 in an airtight manner by means of the O-ring 37.

There is provided a piston spring 38 at the right end side of the piston 5. The left end side of the piston spring 38 is externally fitted to the right end side of the rod portion 33 and abuts against the body portion 32 of the piston 5. The right end side of the piston spring 38 is fitted to a spring holder portion 39. The spring holder portion 39 is formed inside the cylinder cap 7 so as to protrude from the right end thereof. The cylinder cap 7 is screw-fixed to an end cap attachment portion 40 having a male screw shape. The end cap attachment portion 40 is formed around the cylinder portion 35. The cylinder cap 7 is screw-fixed to the end cap attachment portion 40 while pressing the piston spring 38. As a result, piston 5 is housed in the cylinder cap 7 while being biased to the left by the piston spring 38.

The needle valve 4 is housed in the needle hole 15. The right end side of the needle valve 4 is made into a male screw portion 41. The male screw portion 41 is screw-fixed to a female screw portion 42. The female screw portion 42 is formed at the left end of the rod portion 33 of the piston 5. The needle valve 4 and piston 5 are made integral with each other. The needle valve 4 moves in the left-right direction with the movement of the piston 5. The left end side of the needle valve 4 is inserted into the nozzle 3. The left end of the needle valve 4 is made into a tapered needle-shaped valve portion 43. That is, the needle-shaped valve portion 43 becomes thinner toward the leading end thereof. The needle-shaped valve portion 43 can be inserted/fitted into a liquid ejection port 44 formed in the nozzle portion 17 of the nozzle 3. Movement of the piston 5 in the left-right direction causes the needle-shaped valve portion 43 of the needle valve 4 to move in the left-right direction within the liquid ejection port 44. The movement of the needle-shaped valve portion 43 allows supply of the coating liquid from the nozzle 3 to be interrupted and allows an opening amount of the liquid ejection port 44 to change so as to appropriately control the supply flow rate of the coating liquid.

Various flow paths through which spray liquid or compressed air is supplied are formed in the body block 2. As illustrated in FIG. 2, a spray liquid flow path 51, an atomizing air flow path 52, a pattern air flow path 53, and a needle air flow path 54 are formed in the body block 2. The flow paths 51 to 54 each extend downward toward the center of the block from a block upper surface 2a to which the joint block 8 is attached. The spray liquid flow path 51 is opened to the needle hole 15 at the block center. As described above, the left end of the needle hole 15 is opened to communicate with the small diameter portion 16b of the nozzle attachment portion 16. The spray liquid flow path 51 communicates with the liquid ejection port 44 through the flow path hole 22 of the nozzle 3.

The atomizing air flow path 52 is connected to a flow path 55 extending in the horizontal direction. The flow path 55 (atomizing air flow path 52) extends toward the left end side of the body block 2 and is opened to the nozzle attachment portion 16. Although the number of the flow paths 55 formed is four in total (two upper flow paths and two lower flow paths), only two of the four flow paths 55 are illustrated in FIG. 2. A communication hole 56 is formed in the flange portion 19 of the nozzle 3. The atomizing air flow path 52 communicates with an atomizing air chamber 57 through the communication hole 56. The atomizing air chamber 57 is formed between the air cap 6 and nozzle 3. A nozzle insertion hole 58 into which the leading end portion of the nozzle 3 is inserted is formed at the center of the air cap 6. The nozzle insertion hole 58 communicates with the atomizing air chamber 57. An auxiliary hole 59 is formed in a left end surface 6a of the air cap 6. A convex portion 60 including the nozzle insertion hole 58 is formed in the left end surface 6a of the air cap 6. The auxiliary hole 59 is opened at a portion retreating from a leading end surface 60a of the convex portion 60 (at a portion slightly shifted to the right in FIG. 1).

The pattern air flow path 53 is connected to a flow path 61 extending in the horizontal direction. The flow path 61 (pattern air flow path 53) extends toward the left end side of the body block 2 and is opened at the left end surface of the body block 2. The number of the flow paths 61 formed is four in total (two upper flow paths and two lower flow paths) as denoted by a dotted line in FIG. 1 (only one of the four flow paths 61 are illustrated in FIG. 2). The opening of the pattern air flow path 53 faces a pattern air chamber 62 which is formed inside the cap nut 10. To the pattern air chamber 62, also an air flow path 63 formed in the air cap 6 is opened. The pattern air flow path 53 communicates with the air flow path 63 through the pattern air chamber 62. Two projection portions 64 are formed in the air cap 6. The air flow path 63 communicates with a pattern air hole 65 formed so as to be opened at the leading end portion of each projection portion 64.

The needle air flow path 54 is connected to a flow path 66 extending in the horizontal direction as illustrated in FIG. 1. The flow path 66 (needle air flow path 54) extends toward the right end side of the body block 2. The flow path 66 is opened to the left end surface of a cylinder chamber 67 formed inside the cylinder portion 35.

Figure 8:
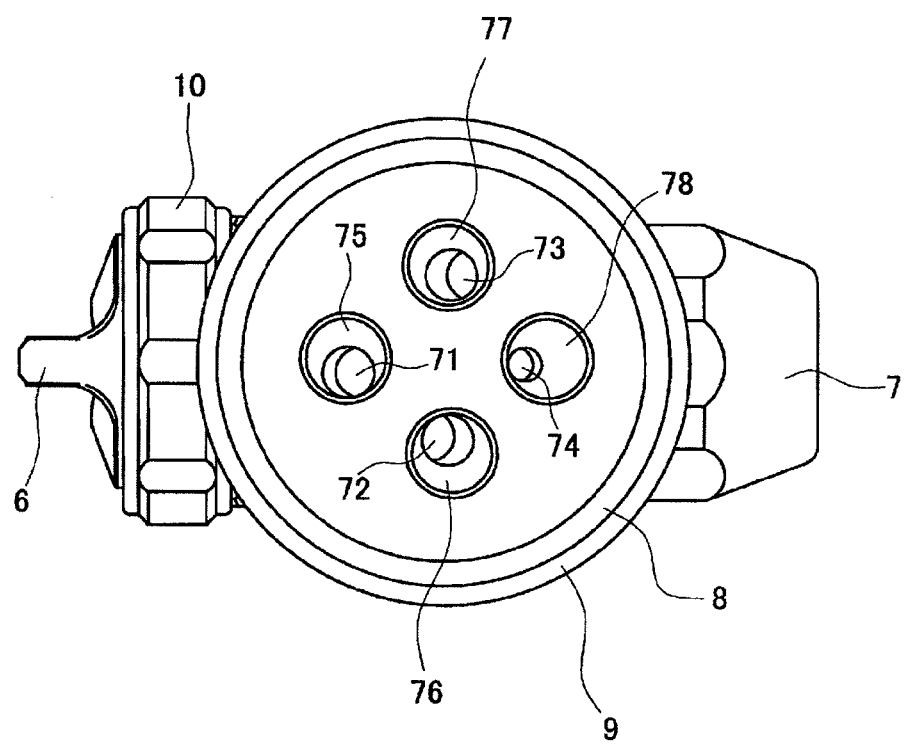
FIG. 8 is a top view of the spray gun.

The joint block 8 also has a spray liquid flow path 71, an atomizing air flow path 72, a pattern air flow path 73, and a needle air flow path 74 corresponding to the flow paths 51 to 54, respectively. The flow paths 71 to 74 are formed in the joint block 8 so as to extend in the vertical direction. Attachment of the joint block 8 to the body block 2 allows the flow paths 51 to 54 and flow paths 71 to 74 to communicate with each other, respectively. FIG. 8 is a top view of the spray gun 1. As illustrated in FIG. 8, the flow paths 71 to 74 are opened at the upper end of the joint block 8 (openings 75 to 78).

Various tubes are connected to the openings 75 to 78 through mouthpieces (not illustrated). That is, a spray liquid tube 91 for supply of the coating liquid is connected to the liquid line port 75 of the spray liquid flow path 71. Various air tubes (atomizing air tube 92, pattern air tube 93, needle air tube 94) for supply of compressed air are connected to the blowing air line port 76 of the atomizing air flow path 72, pattern air line port 77 of the pattern air flow path 73, and cylinder line port 78 of the needle air flow path 74, respectively.

In the spray gun 1, the coating liquid L is supplied from the liquid line port 75 to the liquid ejection port 44 through the spray liquid flow paths 71 and 51, needle hole 15, and flow path hole 22. The atomizing air A is supplied from the blowing air line port 76 to the nozzle insertion hole 58 and auxiliary hole 59 through the atomizing air flow paths 72 and 52, flow path 55, nozzle attachment portion 16, communication hole 56, and atomizing air chamber 57. The pattern air P is supplied from the pattern air line port 77 to the pattern air hole 65 through the pattern air flow paths 73 and 53, flow path 61, pattern air chamber 62, and air flow path 63. The needle air is supplied from the cylinder line port 78 to the piston chamber 67 through the needle air flow paths 74 and 54 and flow path 66.

In the spray gun 1, connection portions to the liquid tube and various air tubes are grouped together and arranged in one place on the side surface of the spray gun 1. This configuration allows the tubes to be collectively connected to the spray gun 1, easily making the tubes 91 to 94 run in a concealed manner in the multifunction unit 132. Further, simply attaching the joint block 8 to the support holder 133 of the coating apparatus 100 allows the spray gun 1 to be set in the casing 2, thus facilitating the attachment/detachment of the spray gun 1, which reduces the operation man-hour required for installation of the spray gun 1. Further, the spray gun 1 is divided into three sections: the tubes 91 to 94, joint block 8, and body block 2, so that simply detaching the joint block 8 allows the tubes 91 to 94 to be exposed, thus facilitating maintenance work such as replacement of the tube. Although four tubes are provided in the present embodiment, there may also be provided a return tube for returning the spray liquid to a liquid tank when there is no need to perform the spraying operation.

Figure 9:
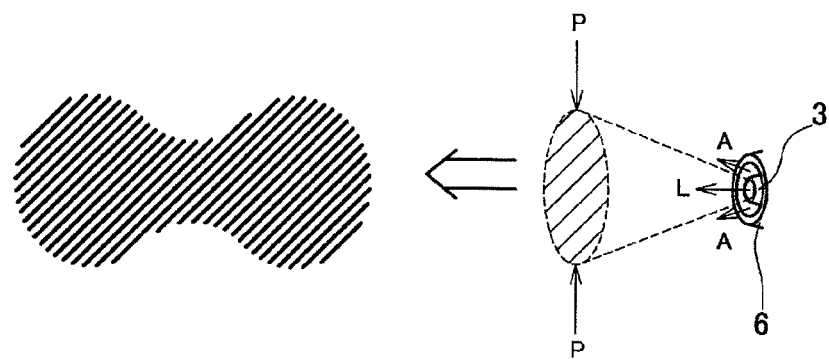
FIG. 9(a) is an explanatory diagram illustrating a spray pattern of a conventional spray gun.
FIG. 9(b) is an explanatory diagram illustrating a spray pattern of the spray gun according to the present invention.
Figure 9:
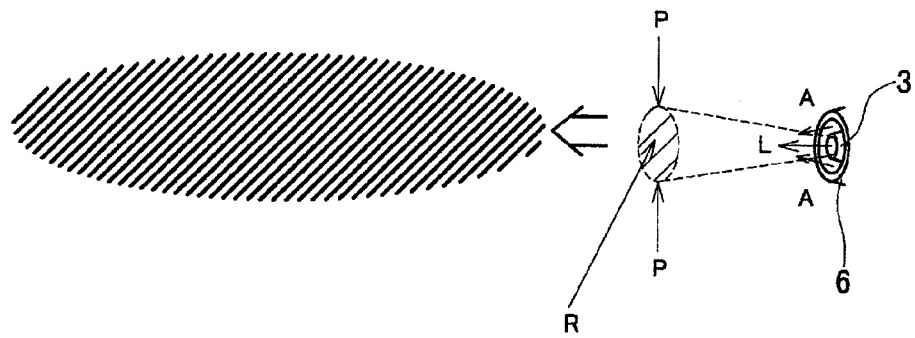

The following describes a spray state of the coating liquid to be sprayed from the spray gun 1. FIG. 9(a) is an explanatory diagram illustrating a spray pattern of a conventional spray gun, and FIG. 9(b) is an explanatory diagram illustrating a spray pattern of the spray gun 1 according to the present invention. As described above, the conventional spray gun is narrow in spray pattern and large in difference (variation) of a spray amount within a spray area. This is because, as illustrated in FIG. 9(a), the pattern air P is applied to the spray mist from the nozzle in a state where the spray mist has been spread widely to become sparse. Therefore, in FIG. 9(a), the spray mist flow is over-influenced by the pattern air P with the result that the spry pattern becomes a figure-of-eight (gourd-shaped). In this case, even if the pattern air P is applied more strongly so as to widen the spray area, the spray pattern hardly spread in the long axis direction and becomes constricted at the center of the gourd-shape.

In the spray gun 1, as illustrated in FIG. 9(b), the spray mist sprayed from the nozzle 3 reaches the spray area of the pattern air P in a state where the spray mist has not been spread widely and is thus still dense. The pattern air P is then applied to the spray liquid in this state. That is, the pattern air P is applied to the spray mist in a spreading-suppressed region R where the flow of the spray mist does not spread over an area greater than or equal to a predetermined cross-sectional area. Thus, in the spray gun 1, the spray mist flow is not over-influenced by the pattern air P with the result that the spray pattern does not become the figure-of-eight but assumes substantially an oval shape. Further, the difference of the spray amount within the spray area can be reduced to a tolerable level.

Figure 10:
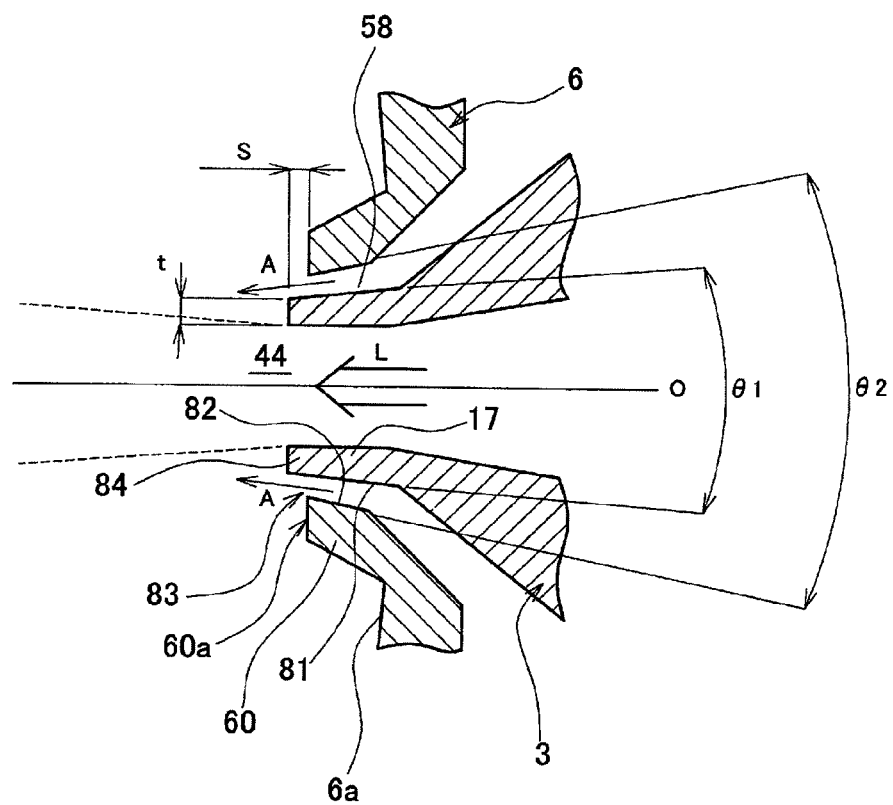
FIG. 10 is an explanatory diagram illustrating a configuration of a nozzle leading end portion of the spray gun according to the present invention.

FIG. 10 is an explanatory diagram illustrating a configuration of a nozzle leading end portion of the spray gun 1 according to the present invention that has achieved such a spray pattern. As illustrated in FIG. 10, the leading end of the nozzle portion 17 of the nozzle 3 has been inserted into the nozzle insertion hole 58 of the air cap 6. An atomizing air jetting port 83 is formed between a leading end outer peripheral portion 81 of the nozzle portion 17 and an inner wall 82 of the nozzle insertion hole 58. The atomizing air jetting port 83 communicates with the atomizing air chamber 57. The atomizing air A is jetted from the atomizing air jetting port 83 in the left direction in FIG. 10. The coating liquid L is ejected from the liquid ejection port 44 of the leading end of the nozzle portion 17. The ejected coating liquid L is atomized by the atomizing air A jetted from the atomizing air jetting port 83. The pattern air P jetted from the pattern air hole 65 of the air cap 6 allows the spray mist having a predetermined spray pattern to be applied to an object of processing.

In the spray gun 1, the leading end outer peripheral portion 81 of the nozzle portion 17 is tapered to be inclined at 10° (nozzle taper angle $\theta 1$). The inner wall 82 of the nozzle insertion hole 58 is also tapered to be inclined at 30° (cap taper angle $\theta 2$). That is, both the leading end outer peripheral portion 81 and inner wall 82 are inclined, at their leading ends, toward a center line O of the liquid ejection port 44 with the result that an opening portion 58a of the nozzle insertion hole 58 is opened toward the center line O. Further, since $\theta 2 > \theta 1$, the nozzle insertion hole 58 becomes narrow in width toward its leading end. Therefore, the atomizing air is jetted from the opening portion 58a in a state where the flow rate has been increased. Further, the thickness of a leading end portion 84 of the nozzle portion 17 is made small (thickness t in the diameter direction is 0.3 mm (25% of the diameter of the liquid ejection port 44) with respect to the liquid ejection hole 44 with a diameter of 1.2 mm).

In the spray gun 1 having such a diameter relationship, the pattern air is jetted from the pattern air hole 65 toward the spray liquid ejected from the liquid ejection port 44 and atomized by the atomizing air. Then, as illustrated in FIG. 9(b), the pattern air P can be applied to the spray liquid sprayed from the nozzle 3 in a state where the spray liquid has not been spread widely. In the spray gun 1, the atomizing air A is jetted toward the center of the liquid ejection port 44, that is, toward the spray flow of the coating liquid L. Thus, in the spray gun 1, the coating liquid ejected from the liquid ejection port 44 is atomized with the outward spread thereof (enlargement of the diameter of the coating liquid flow) suppressed as compared to a case where the atomizing air A is jetted in the horizontal direction or outwardly. Further, the small thickness of the nozzle leading end portion 84 allows the atomizing air to be effectively applied to the spray flow of the coating liquid.

Thus, as compared to the case of the conventional spray gun, the spray mist flow is formed in a convergent manner to reduce the spreading degree of the spray mist flow at a region where the pattern air is applied thereto. Applying the pattern air to the spray mist flow at the spreading-suppressed region R (region having a cross-section area equal to or less than four times that of the liquid ejection port 44, that is, having a diameter equal to or less than about 2.2 times that of the liquid ejection port 44) of the spray mist flow makes the spray pattern into the oval shape, not the figure-of-eight shape. Further, the difference of the spray amount within the spray area can be reduced to a tolerable level.

As illustrated in FIG. 10, in the spray gun 1, the leading end portion 84 of the nozzle 3 slightly protrudes relative to the convex portion leading end surface 60a of the air cap 6 that forms the atomizing air jetting port 83. In the spray gun 1, the protruding amount s is set to 0.25 mm. Making the nozzle leading end portion 84 protrude from the convex portion leading end surface 60a as described above makes it easier for the coating liquid to be ejected from the liquid ejection port 44 by a negative pressure effect caused by spray of the atomizing air. When the nozzle leading end portion 84 is made aligned with the convex portion leading end surface 60a, the spray liquid is easily adhered to the nozzle 3 or air cap 6; on the other hand, making the nozzle leading end portion 84 protrude suppresses the adherence of the spray liquid. However, when the protruding amount s becomes too large, the adherence amount increases to cause a pulsation in the spray of the coating liquid due to excessive negative pressure. In the spray gun 1, s=0.25 mm is defined as the balance point. However, depending on a coating condition, a value in a range from about 0.1 mm to about 1.0 mm is appropriately set.

Figure 11:
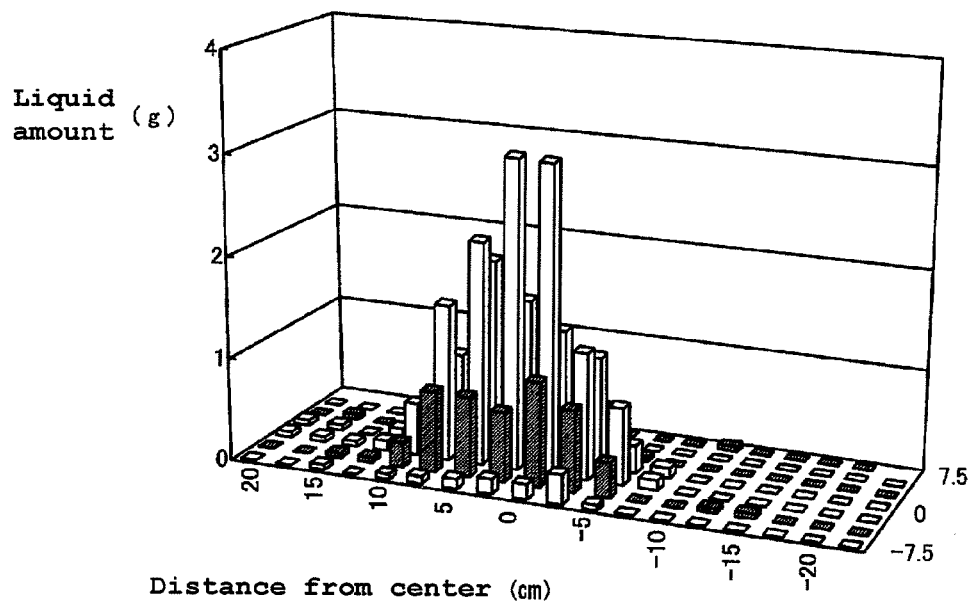
Figure 11:
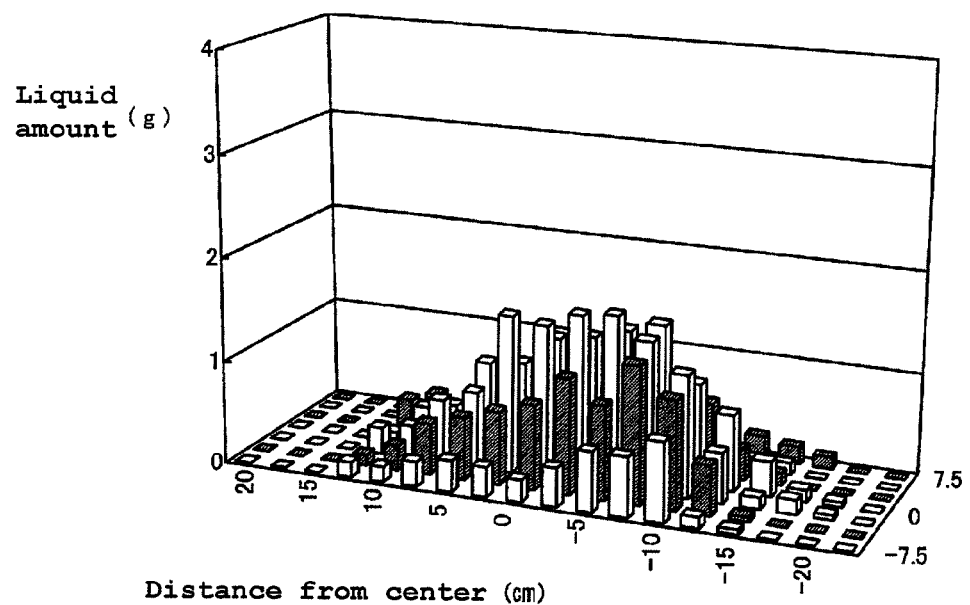

FIG. 11 is an explanatory diagram illustrating a distribution of the spray mist sprayed from the spray gun. FIGS. 11(a) and 11(b) illustrate the distribution of the mist sprayed from the conventional spray gun and that of the mist sprayed from the spray gun 1 according to the present invention, respectively (measurement distance: 200 mm from nozzle portion leading end, spray liquid: water, liquid rate: 100 mL/min, atomizing air: conventional spray gun=200 L/min, present invention=125 L/min, pattern air: conventional spray gun=100 L/min, present invention=150 L/min). As illustrated in FIG. 11(a), in the case of the conventional spray gun, the spray mist centers around the center portion thereof and the mist amount abruptly decreases with increasing distance from the center portion. On the other hand, in the case of the spray gun 1 according to the present invention, the spray mist spreads over a wide range, and a change in the mist amount becomes gentle with increasing distance from the center portion. The average particle diameter is about 24 μm for the conventional spray gun; while about 15 μm for the spray gun 1, that is, more fine atomization of the spray mist has been achieved.

Figure 12:
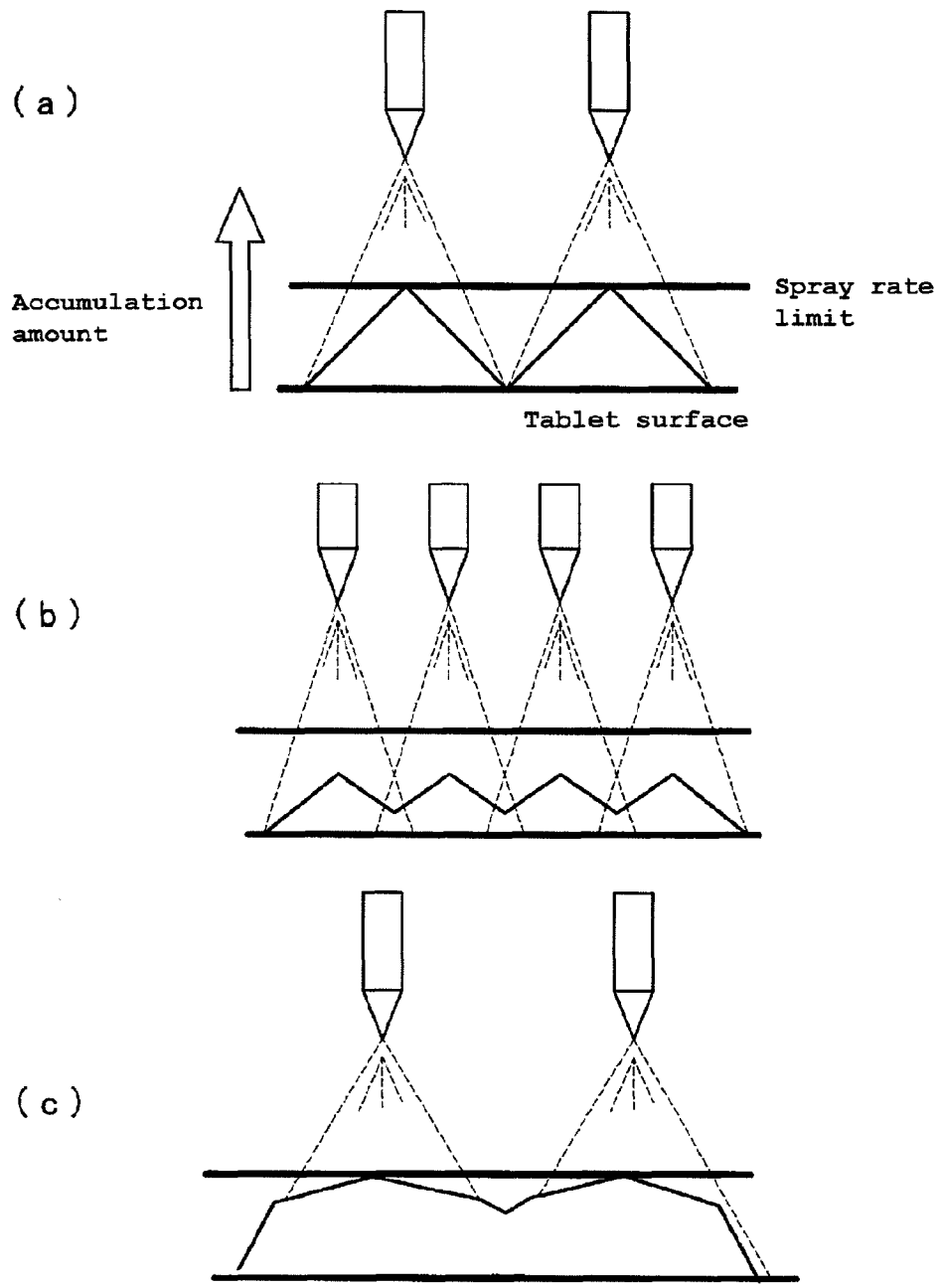
FIG. 12(a) is an schematic diagram illustrating a spray state obtained using the conventional spray gun.
FIG. 12(b) is an schematic diagram illustrating a state where the number of the spray guns is increased so as to obtain a desired coating product.
FIG. 12(c) is an schematic diagram illustrating a spray state obtained using the spray gun according to the present invention.

Further, the use of the spray gun 1 allows a reduction in the installation number of the spray guns, which can result in a reduction in the apparatus price. FIG. 12(a) is an schematic diagram illustrating a spray state obtained using the conventional spray gun, FIG. 12(b) is an schematic diagram illustrating a state where the number of the spray guns is increased so as to obtain a desired coating product, and FIG. 12(c) is an schematic diagram illustrating a spray state obtained using the spray gun according to the present invention. As illustrated in FIG. 12(a), the spray mist centers around the center portion thereof in the case of the conventional spray gun, so that in order to uniformly spray the spray mist in a wide range, the number of the spray guns needs to be increased as illustrated in FIG. 12(b). On the other hand, in the case of the spray gun according to the present invention, the spray mist is comparatively uniformly sprayed over a wide range, so that a desired coating product can be obtained with a small number of the spray guns as illustrated in FIG. 12(c).

Figure 13:
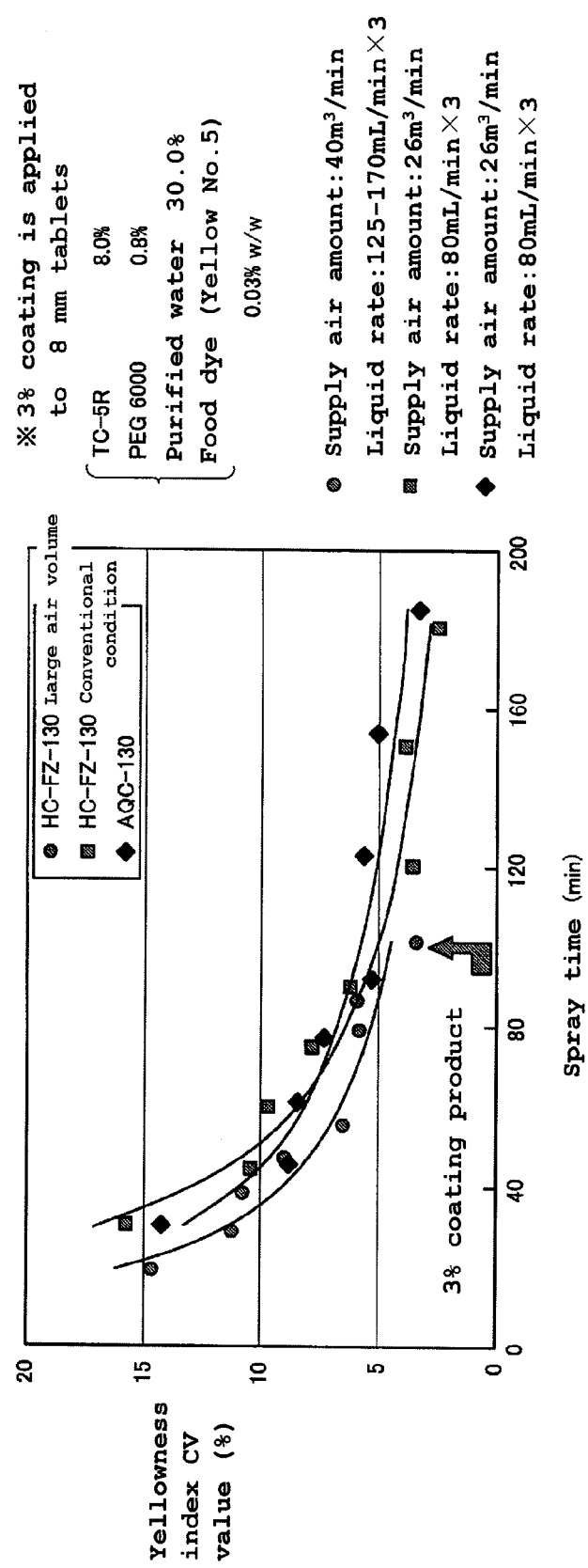
FIG. 13 is a graph representing a relationship between spray operation time and yellowness index CV value obtained when 3% w/w coating was applied to a tablet of $\phi$8 mm.

Further, according to the spray gun 1 of the present invention, large-volume spraying can be performed uniformly, thereby reducing the spray operation time. FIG. 13 is a graph representing a relationship between spray operation time and yellowness index CV value obtained when 3% w/w coating was applied to a tablet of ϕ8 mm. In FIG. 13, a circular mark represents data obtained in the case where the spray gun according to the present invention was used with a large air volume, a square mark represents data obtained in the case where the spray gun according to the present invention was used under a conventional condition, and a rhombic mark represents data obtained in the case where the conventional spray gun was used under the conventional condition. As can be seen from FIG. 13, it takes about 180 minutes to complete the processing in the case where the conventional spray gun is used under the conventional condition, while about 100 minutes to obtain the 3% coating product in the case where the spray gun according to the present invention is used. Thus, a significant reduction in the processing time can be achieved. Under the conventional condition, substantially the same processing time as in the case of using the conventional spray gun is taken even in the case where the spray gun according to the present invention is used. However, the spray gun according to the present invention can provide a uniform spray pattern even with a large air volume, thus enabling a desired coating product to be obtained in a shorter time than ever before.

Figure 14:
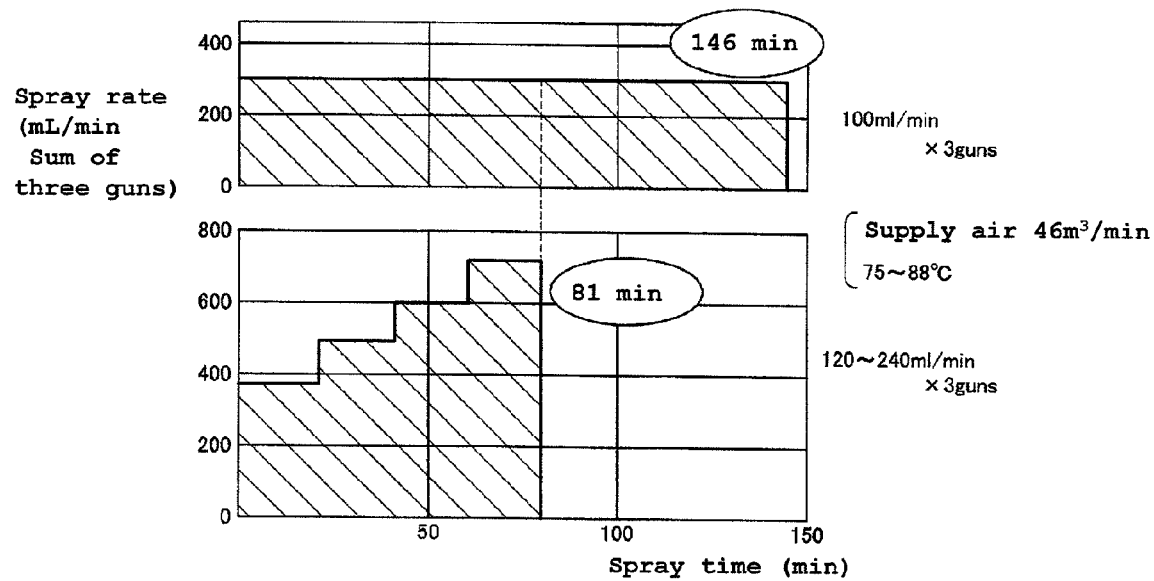
FIG. 14 is an explanatory diagram illustrating a spray rate setting in the case where water-based film coating is performed.

FIG. 14 is an explanatory diagram illustrating a spray rate setting in the case where water-based film coating is performed. In this example, three spray guns were used to apply water-based film coating 3% w/w (Hypromellose (TC-5R): 8.0%, Macrogol 6000: 0.8%, purified water: 91.2%, food dye (Yellow No. 5): 0.03% w/w) to ϕ8 mm CR tablet 130 kg. In the case of using the conventional spray gun, when the spray rate is increased as time advances, local wetting occurs to cause coating unevenness. Thus, it was necessary to perform the coating process while maintaining the spray rate (100 mL/min×three guns) with the result that 146 minutes were taken to complete the processing (FIG. 14(a)). On the other hand, the spray gun according to the present invention can perform large volume spraying uniformly, thereby allowing the spray rate to be increased as time advances. Thus, as illustrated in FIG. 14(b), only 81 minutes was taken to complete the processing by increasing the spray rate stepwise (120 mL to 240 mL/min×three guns).

As described above, the application of the spray gun 1 according to the present invention to the pan coating apparatus prevents the object of processing such as tablets from getting wet locally even when a large amount of coating liquid is sprayed thereto and allows formation of a uniform coating layer on the tablets, thus securing stable product quality. Further, even when the coating process is performed with a large air volume, it is possible to suppress a variation in the spray amount within the spray area, thereby reducing a time required for the coating process while maintaining the product quality. Further, it is possible to provide uniform and stable spray amount without increasing the number of the spray guns to reduce the number of the spray guns to be used, thereby allowing a reduction in the apparatus price. Further, the number of incidental facilities such as pump units, valves, electromagnetic valves can be reduced. In addition, man-hour required for installation or maintenance of the spray guns can be reduced to allow a reduction in the product cost.

The above-described coating apparatus 100 has high drying performance due to adoption of the front side air charging configuration and punched structure of the drum. Rotation of the drum 101 stirs the objects of processing in the drum, achieving uniform mixture. Thus, in the coating apparatus 100 using the spray gun 1 according to the present invention, uniform coating process can be achieved in a short time by synergetic effect of the uniform and stable high-performance spraying, high drying performance, and effective stirring. That is, the spray gun 1 can exert its performance more effectively by being combined with the coating apparatus 100.

The present invention is not limited to the above embodiment but may be modified without departing from the scope of the invention.

For example, although the spray gun according to the present invention is applied to the pan coating apparatus in the above embodiment, it may be applied to another powder and particle processing apparatus such as a fluidized-bed apparatus. Further, the spray gun according to the present invention may cope with a case where the coating is performed for moving objects and may be suitably applied to, e.g., a line for coating automobiles or furniture. Especially, in the case where the spray gun needs to be fixed, the spray gun according to the present invention capable of performing uniform and wide range spraying is effective.

The dimensions described in the above embodiment are exemplary, and the present invention is no limited thereto. For example, a nozzle taper angle θ1 of about 5° to 15°, a cap taper angle θ2 of about 20° to 40°, and a nozzle leading end thickness t of about 0.2 mm to 0.4 mm may appropriately be combined depending on a processing condition or type of the object of processing.

The invention claimed is:

1. A spray gun for spraying, to an object of processing, spray liquid atomized by atomizing air, said spray gun comprising:
   a nozzle body including a nozzle portion having a liquid ejection port from which the spray liquid is ejected, said nozzle portion having an outer peripheral portion formed in a tapered shape such that it becomes smaller in diameter up to a leading end of the nozzle portion; and
   an air cap including a nozzle insertion hole in which the nozzle portion is positioned, said nozzle insertion hole having an inner wall facing the outer peripheral portion of said nozzle portion and formed in a tapered shape such that it becomes smaller in diameter up to a leading end of the nozzle insertion hole, and
   a pattern air hole which is disposed on a front side relative to the liquid ejection port and through which pattern air is jetted to a mist flow of the spray liquid that has been atomized; and
   a convex portion, formed as a protrusion of a leading end surface of the air cap; and an atomizing air jetting port in the convex portion of the air cap formed by the outer peripheral portion of the nozzle portion and the inner wall of the nozzle insertion hole of the air cap, the atomizing air jetting port configured to jet the atomizing air toward a center line of the liquid ejection port from the atomizing air jetting port to suppress spreading of the mist flow,
   wherein the leading end of the nozzle portion protrudes relative to a lead end surface of the convex portion of the air cap,
   wherein the tapered shape of the outer peripheral portion of the nozzle portion has an angle $\theta 1$, and the tapered shape of the inner wall of the nozzle insertion hole has an angle $\theta 2$ larger that the angle $\theta 1$ ($\theta 2 > \theta 1$) so as to cause a flow rate of the atomizing air jetted from the atomizing air jetting port to be increased, and
   wherein the pattern air hole is configured to jet the pattern air to the mist flow in a spreading suppressed region where the mist flow does not spread over an area greater than or equal to a predetermined cross-sectional area and has substantially a circular cross-section to form an oval-shaped spray pattern.

2. The spray gun according to claim 1, wherein the angle $\theta 1$ is set in a range of 5° to 15°, and the angle $\theta 2$ is set in a range of 20° to 40°.

3. The spray gun according to claim 2, wherein
   a thickness t of an outer peripheral portion of the liquid ejection port in the nozzle body is set in a range of 0.2 mm to 0.4 mm.

4. The spray gun according to claim 3, wherein
   the angle $\theta 1$ is set in a range of 8° to 12°, and the angle $\theta 2$ is set in a range of 25° to 35°.

5. The spray gun according to claim 3, wherein
   a thickness t of an outer peripheral portion of the liquid ejection port in the nozzle body is 25% of the diameter of the liquid ejection port.

6. The spray gun according to claim 1, wherein
   the spray gun is configured to spray the spray liquid to a moving object of processing.

7. The spray gun according to claim 1, wherein
   the spray gun is disposed in a casing and is configured to spray the spray liquid to an object of processing housed in the casing.

8. The spray gun according to claim 7, wherein
   the spray gun is disposed in a casing having an air-permeable structure.

9. The spray gun according to claim 8, wherein
   the spray gun is configured in a pan coating apparatus that applies coating process to a powder and particle housed in the casing having the air-permeable structure.

10. The spray gun according to claim 9, wherein
    the pan coating apparatus is a front side air charging apparatus that introduces coating process gas from the apparatus front side.

11. The spray gun according to claim 9, wherein
    the pan coating apparatus has a punched type drum whose barrel portion is formed so as to be air-permeable.

12. The spray gun according to claim 1, wherein the leading end surface of the air cap has an auxiliary hole for jetting the atomizing air, and
    the auxiliary hole is open at a portion of the end surface not on the convex portion of the air cap.

* * * * *